Figure 1:
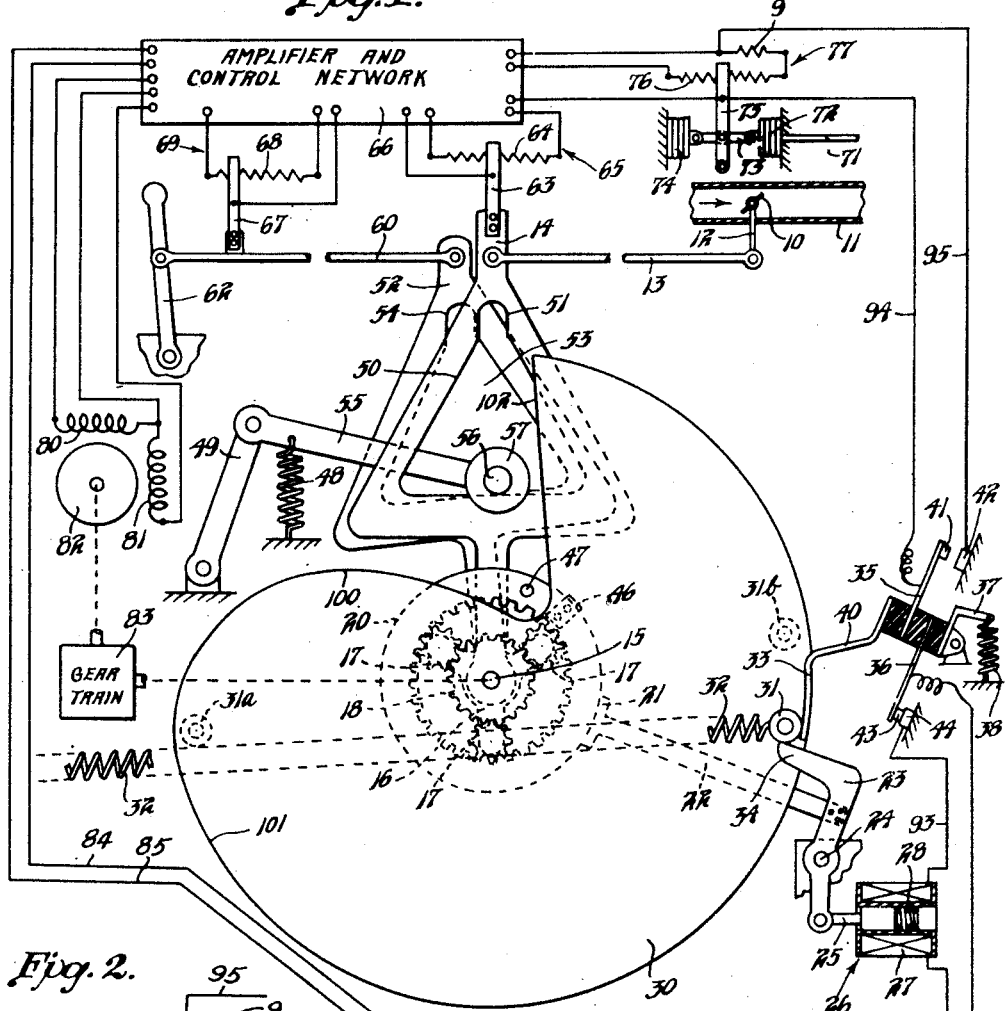

Oct. 7, 1947.  A. E. BAAK  2,428,606

CONTROL APPARATUS

Filed April 29, 1943

Inventor
ALBERT E. BAAK

By George H. Fisher
Attorney

Patented Oct. 7, 1947

2,428,606

UNITED STATES PATENT OFFICE 2,428,606

CONTROL APPARATUS

Albert E. Baak, Los Angeles, Calif., assignor to Minneapolis-Honeywell Regulator Company, Minneapolis, Minn., a corporation of Delaware Application April 29, 1943, Serial No. 485,049

16 Claims. (Cl. 123—103)

1

The present invention relates to control apparatus, and particularly to control apparatus of the type wherein a load device may be positioned either by automatically controlled motor means or by a manually operable control member.

In many control systems wherein a load device is automatically positioned by an automatically controlled motor, it is desirable to provide means whereby the load device may be manually positioned in case the supply of power to the motor fails, or if for any other reason the operation of the automatic control system becomes unsatisfactory. Such a system is shown and claimed in my copending application, Serial No. 483,901, filed April 21, 1943. In that application I have shown a system in which a load device may be positioned either by an automatically controlled motor or by a manual control member, and in which a releasable connection between the motor and the load device is automatically completed when power is supplied to the system, and at the same time a releasable connection between the manual control and the load device is automatically released. In my previous application, however, an additional motor was required to operate the re-releasable connection between the load device and the manual control member, in addition to the motor which was used to drive the load device. It will be recognized that the use of such an additional motor greatly increases the expense of the control system.

It is therefore an object of my invention to provide improved control apparatus of the type shown in my co-pending application, Serial No. 483,901, filed April 21, 1943.

Another object of my invention is to provide improved control apparatus of the type in which a load device is positioned either by an automatically controlled motor, or by a manually movable control member. A further object of my invention is to provide an arrangement of the type described, in which a releasable connection is provided between the manual control member and the load device, and the same motor which is used to position the load device is also used to operate the releasable connection.

Another object of the present invention is to provide an improved releasable mechanical connection including a member which in one position permits the transmission of motion through the connection, and in another position permits the relative movement of the two members connected thereby.

Another object of the present invention is to

2 provide an improved system for controlling the throttle of an internal combustion engine. A further object is to provide such an improved throttle control system for use in connection with apparatus for controlling the pressure of the air supplied to the intake manifold of the engine.

Figure 2:
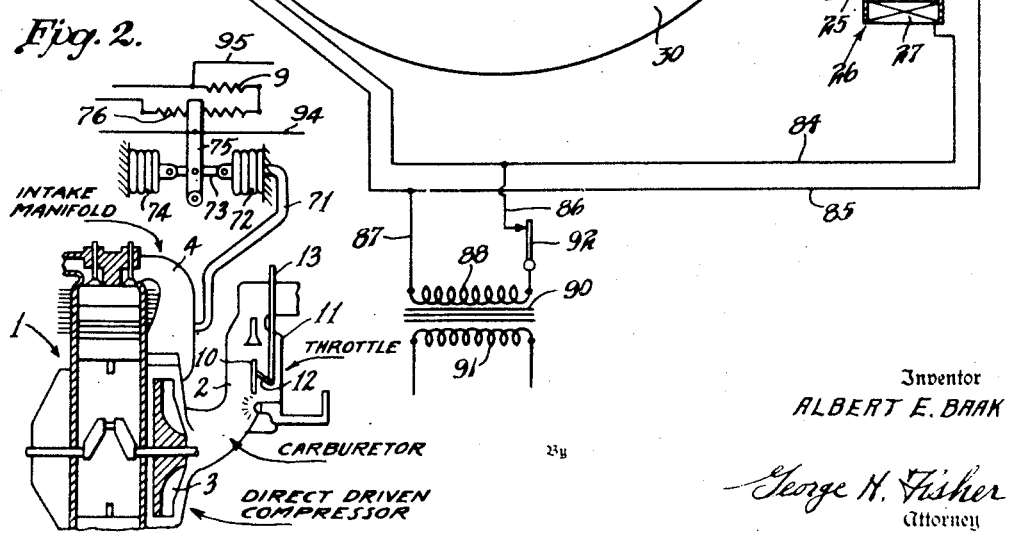

Other objects and advantages of the present invention will become apparent from a consideration of the appended specification, claims and drawing, in which Figure 1 represents, somewhat diagrammatically, an electrical control system embodying my invention, and Figure 2 shows the association of the intake manifold pressure responsive device and the throttle valve with a typical aircraft engine.

Referring to the drawings, a typical aircraft engine is indicated at 1. The engine includes a carburetor 2, a direct driven compressor 3 and an intake manifold 4. Located in the carburetor 2 is a throttle valve 10 positioned in a conduit portion 11 of the carburetor and through which the air for supporting combustion passes.

The throttle 10 may be positioned by an arm 12 which is rigidly attached thereto. A link 13 is pivotally connected to the opposite end of arm 12, and the opposite end of link 13 is pivotally attached to lever 14. The opposite end of lever 14 is mounted for free rotational movement on a shaft 15. The end of lever 14 associated with shaft 15 also carries a spider 16, on which a plurality of planet gears 17 are pivotally mounted. The shaft 15 has a sun gear 18 attached thereto, which meshes with the planet gears 17. A ring gear 20 surrounds and meshes with the planet gears 17.

A brake shoe 21 cooperates with the outer surface of ring gear 20. The brake shoe 21 is carried at the end of an arm 22, which is attached by any suitable means to a bell crank lever 23. The bell crank lever 23 is pivotally mounted on a fixed support, as indicated at 24. One end of the bell crank lever 23 is pivotally attached to an armature 25 associated with an electromagnet 26. The electromagnet 26 is provided with a coil 27, which upon energization attracts the armature 25 and moves it to the position shown in the drawing, against the action of a compression spring 28, which biases the armature 25 for movement to the left from the position shown.

A cam 30 is mounted for free rotation on the shaft 15. The cam 30 is provided with a pin 31 extending laterally therefrom at a point near its periphery. A tension spring 32 extends from pin 31 substantially horizontally and to the left, to a point well beyond the cam 30 to a fixed pin (not shown).

The spring 32 biases the cam 30 for rotation in a clockwise direction from the position shown in the drawing. The end of the bell crank lever 23 opposite the armature 25 has a laterally extending projection 34, which, when the electromagnet 26 is energized, extends into the path of pin 31, and thereby prevents rotation of the cam 30 clockwise from the position shown in the drawing under the influence of biasing spring 32.

The ring gear 20 carries a pin 47 which extends forwardly from the ring gear 20 and is adapted to engage a bracket 46 attached to the rear surface of the cam 30 for a purpose to be hereinafter set forth.

A pair of switch blades 35 and 36 are insulatingly supported on a pivotally mounted bracket 37. A tension spring 38, connected between one end of bracket 37 and a stationary support, biases the bracket 37 and the switch blades carried thereby for rotation in a clockwise direction from the position shown in the drawing. A resilient finger 40 is also carried by the bracket 37, and has a portion 33 that extends into the path of the pin 31 of cam 30. When the cam 30 is in the position shown in the drawing, the pin 31 engages the portion 33 of finger 40, thereby moving the bracket 37 and the switch blades 35 and 36 carried thereby to the position shown in the drawing.

The switch blade 35 carries a contact 41, which cooperates with a stationary contact 42. The contacts 41 and 42 are spaced apart when the switch blade 35 is in the position shown in the drawing. The switch blade 36 carries a contact 43 which cooperates with a stationary contact 44. The contacts 43 and 44 are in engagement when the switch blade 36 is in the position shown in the drawing.

The lever 14 is provided with a generally triangular aperture 15 at an intermediate point thereon. The upper vertex of the triangular aperture 50 is formed into a rounded notch 51. Another lever 52, which is generally of the same form as the lever 14, is freely mounted for rotation on the shaft 15. The lever 52 is provided with an aperture 53 of the same form as the aperture 50, and terminating at its upper end in a rounded notch 54 of the same shape as the notch 51.

An arm 55 lies between the levers 14 and 52 adjacent the apertures 50 and 53, and carries at its extremity a pin 56 which projects from the arm 55 in both directions and through the apertures 50 and 53. The pin 56 extends forwardly in the drawing through the aperture 50 to a point aligned with the cam 30, where the pin 56 carries a roller 57 which cooperates with the cam 30. The notches 51 and 54 are shaped to conform with the pin 56, so that when it is moved into those notches, it fits snugly therein. The left end of arm 55 is pivotally attached to a link 49, whose opposite end is attached to a fixed support. A tension spring 48 is attached at one end to the arm 55 and at its opposite end to a fixed support, and biases the arm 55 for clockwise rotation about its left end.

The upper end of lever 52 is pivotally connected to a link 60 whose opposite end is pivotally connected to a manually movable control lever 62.

The upper end of the lever 14 carries a slider 63 which cooperates with a slidewire resistance 64. The slider 63 and the slidewire resistance 64 together form a follow up potentiometer 65. The terminals of resistance 64 and the slider 63 are connected by suitable conductors to terminals of an amplifier and control network generally indicated at 66. This network may take any desired form, such for example as the kind shown in Harrison Patent No. 2,312,711, but preferably is of the type illustrated in detail in my co-pending application, Serial No. 483,901, filed April 21, 1943.

The link 60 also carries a slider 67 which cooperates with a resistance 68. The slider 67 and the slidewire resistance 68 together form a control point adjusting potentiometer 69. The terminals of resistance 68 and the slider 67 are connected through suitable conductors to the amplifier and control network 66.

A conduit 71 transmits pressure from the interior of the intake manifold 4 of the engine 1 to the interior of a bellows 72. One end of the bellows 72 is fixed, and its opposite end is attached to a link 73. The opposite end of link 73 is connected to the free end of a second bellows 74, which is substantially evacuated. The other end of bellows 74 is mounted on a fixed support. A slider 75 is moved by the link 73 through a pin and slot connection (not shown), and the slider 75 moves along a slidewire resistance 76. The slider 75 and resistance 76 together form a control potentiometer 77. The terminals of resistance 76 and the slider 75 are connected through suitable conductors and a resistance 9 to the amplifier and control network 66.

The amplifier and control network 66 controls the supply of electrical energy to the windings 80 and 81 of a motor generally indicated at 82. The motor 83 is of the split phase type, and rotates in one direction or the other, depending upon the relative phase displacement of the current supplied to field windings 80 and 81. The motor 82 drives the shaft 15 through a gear train 83.

Electrical energy is supplied to the amplifier and control network 66, and hence to the motor 82, from a pair of conductors 84 and 85. The conductors 84 and 85 are in turn connected through conductors 86 and 87 to the terminals of a secondary winding 88 of a transformer 90 having a primary winding 91. A switch 92 is connected in the conductor 86, by which the supply of energy through the conductor 84 may be terminated.

An energizing circuit for the winding 27 of electromagnet 26 is provided which may be traced from the right hand terminal of secondary winding 88 through switch 92, conductor 86, conductor 84, winding 27, a conductor 93, contacts 44 and 43, switch blade 36, and conductors 85 and 87 to the left terminal of secondary winding 88.

A connection is provided for shunting that portion of the slidewire resistance 76 between the slider 75 and its right hand terminal. This connection may be traced from slider 75 through a conductor 94, switch blade 35, contacts 41 and 42, and conductor 95 to the right terminal of resistance 76.

*Operation*

The operation of the amplifier and control network 66 and the potentiometers 65, 69, and 77, and their effect upon the motor 82 will first be described in order that the advantages of my present invention may be better understood.

When the parts are in the position shown in the drawing, the switch 92 is closed, so that power is supplied to the electromagnet 26 and to the amplifier and control network 66. The ring gear 20 is held fixed by the brake shoe 21 operated by the electromagnet 26. If the motor 82 now rotates the shaft 15 clockwise, the sun gear 18 attached to the shaft 15 and which meshes with the planet gears 17, rotates them counter-clockwise about their respective pivots. The planet gears therefore roll on the internal teeth of the ring gear 20, thereby rotating the lever 14 and the slider carried at the upper end thereof clockwise about the shaft 15. The link 13 is thus moved to the right, thereby causing a counter-clockwise movement of the arm 12, and carrying the throttle 10 towards its closed position. Conversely, rotation of the shaft 15 counter-clockwise by the motor 82 causes a movement of the throttle 10 towards its open position.

As explained in detail in my co-pending application previously referred to, the network 66 operates to energize the motor 82 for rotation in one direction or the other, depending upon the relative positions of the control potentiometer 77 and the follow up potentiometer 65. For example, if the slider 75 of control potentiometer 77 is moved to the right along resistance 76, as would be the case if the pressure in the intake manifold decreased, the network 66 would respond by energizing the motor 82 in a manner to rotate shaft 15 in a counter-clockwise direction, thereby opening the throttle 10 wider, restoring the pressure in the bellows 72 towards its original value. This motion of the throttle 10 towards open position would be accompanied by a concurrent motion of the slider 63 to the left along resistance 64. This motion of slider 63 rebalances the effect on the network of the change in position of slider 75, so that the motor 82 is stopped after the slider 63 has moved a short distance, the distance moved by the slider 63 being proportional to the controlling movement of slider 75. In a similar manner, an increase in pressure in the intake manifold causes a movement of slider 75 to the left along resistance 76, thereby causing a closing movement of the throttle 10 and a rebalancing movement of slider 63 to the right.

The control point adjusting potentiometer 69 is provided to vary the relationship between the positions of slider 75 and the rebalancing position of the slider 63. In other words, a change in the position of slider 67 changes the position of slider 63 at which the network is balanced when the slider 75 is in a given position. The potentiometer 69 is termed a control point adjusting potentiometer, since it determines the pressure value which the system maintains in the intake manifold of the engine.

Now let it be assumed that the power supply to the system is cut off, either due to the opening of switch 92, or to the failure of the source of electrical energy connected to transformer primary winding 91. When this occurs, the electromagnet 26 is deenergized, and the compression spring 28 pushes the armature 25 to the left, thereby rotating the bell crank lever 23 clockwise, and moving the brake shoe 21 out of engagement with ring gear 20 and simultaneously moving the extension 34 on bell crank lever 23 out of the path of pin 31.

The cam 30 is then free to rotate on the shaft 15 under the influence of the spring 32. The cam 30 therefore rotates clockwise about the shaft 15 nearly half a revolution and until pin 31 is substantially directly horizontally across from its present position, to a position indicated in dotted lines and by the numeral 31a. As the cam 30 thus rotates, a riser portion 100 of the cam engages the roller 57 on the end of pin 56, thereby moving the arm 55 counter-clockwise against the influence of biasing spring 48. As the arm 55 moves upward, the pin 56 engages the interior surfaces of the apertures 50 and 53, and follows those surfaces up until it engages the notches 51 and 54. If the apertures 50 and 53 are not in alignment at this time, they are forced into alignment by the action of pin 56 against their respective surfaces. When the cam 30 has completed its clockwise rotation under the influence of spring 32, the roller 57 rests on a high dwell portion 101 of the cam 30, which is of constant radius. This high dwell portion 101 is of sufficient extent with the cam 30 in its new position that the pin 56 may be moved circumferentially of the cam 30, throughout the range of movement of the levers 14 and 52, without the roller 57 moving off the high dwell portion 101. At this time, the bracket 46 on the back of the cam has moved nearly a half revolution.

When the pin 56 engages the notches 51 and 54, the manually movable lever 62 and the throttle 10 are mechanically directly connected. At such a time, a movement of the lever 62 to the right is transmitted through link 60, lever 52, pin 56, lever 14, link 13, arm 12, to throttle 10 so as to move the throttle towards closed position. Likewise, a movement of the lever 62 to the left causes the throttle 10 to be moved towards open position. The throttle is then completely under the control of the lever 62.

At this time, the ring gear 20 is free to move, since the brake shoe 21 has been separated therefrom. Also, the sun gear 18 is substantially locked, since it is connected to the rotor of the motor 82 through the high reduction gear train 83, so that it is practically impossible to move the sun gear 18 due to the resistance of the gear train. Therefore, when the lever 14 is moved by the control lever 62, the planet gears 17 roll on the surface of the sun gear 18, and this motion is permitted by the freedom of movement of the ring gear 20.

When the cam 30 initially moved clockwise from the position shown in the drawing, the pin 31 moved out of engagement with the portion 33 of finger 40. The spring 38 therefore moved the bracket 37 and the switch blades 35 and 36 carried thereby in a clockwise direction from the position shown, until the switch blade 35 caused engagement of contacts 41 and 42. At the same time, the position of the switch blade 36 caused the contacts 43 and 44 to be separated, thereby opening the energizing circuit previously traced for the electromagnet 26.

This then is the "manual" or "power failure" position of the apparatus in which the pilot can position the throttle 10 as he desires, by manipulating the lever 62. Under these conditions, the automatic control system cannot in any manner position throttle 10 nor can it interfere with the manual positioning thereof.

Let it now be assumed that the electrical energy is restored to the system, either through repair of the apparatus or by the closure of the switch 92, as the case may be. The closure of the contacts 41 and 42 when the system was placed on manual operation established a shunt connection across the right hand portion of the resistance 76 as well as resistance 9. It is believed to be readily understandable that this shunting of the right hand portion of resistance 76 and the resistance 9 has an effect on the network 66 similar to that which would be obtained if the slider 75 were moved to the right even if slider 75 should be in its extreme right hand position at such time. Such a motion of slider 75 to the right indicates a drop in pressure in the intake manifold, and would cause a response of the network 66 in such a manner that motor 82 drives shaft 15 counter-clockwise, so as to attempt to open the throttle and increase the pressure in the intake manifold. The shunting action of contacts 41 and 42 causes a similar action.

However, since the ring gear 20 is released at this time, the counter-clockwise rotation of shaft 15 is not effective to cause a motion of the throttle 10. Instead, the counter-clockwise rotation of shaft 15 causes a clockwise rotation of the planet gears 17 about their respective pivots, thereby driving the ring gear 20 (which is relatively free to move as compared with the lever 14) in a clockwise direction. When this clockwise motion of the ring gear 20 has constituted about a half revolution, the pin 47 engages the bracket plate 46 on the back of cam 30, thereby rotating the cam 30 clockwise upon further clockwise rotation of the ring gear 20.

This clockwise movement of the cam 30 continues until pin 31 has been moved from the dotted position 31a to a position indicated in dotted lines at 31b. In such position, the now stretched spring 32 passes over the axis of shaft 15. Upon a further slight clockwise movement of cam 30, the spring 32 passes over the axis of shaft 15 and thereupon acts as an over-center snap-action device to quickly rotate cam 30 to the position shown in the drawing. Upon this initial snap movement of cam 30, the pin 31 engages the upper end of portion 33 of finger 40 thereby moving the contacts 41 and 43 to the positions shown. In such position the magnet coil 27 is again energized and latch 34 moves into the path of pin 31 to stop it and the cam 30 in the position shown. Movement of contact 41 away from contact 42 breaks the shunt circuit around the right-hand portion of slider 75 and resistance 9. Also, during this snap movement of cam 30, the drop off portion 102 rides out from under roller 57 whereupon spring 48 moves arm 55 to the position shown on the drawing. The system is now again on automatic operation and the throttle 10 will move to the position demanded by the pressure responsive controller 77 and manual controller 69.

While I have shown and described a preferred embodiment of my invention, other modifications thereof will occur to those skilled in the art, and I therefore wish my invention to be limited only by the appended claims.

I claim as my invention:

1. Control apparatus, comprising in combination, a load device to be positioned, motor means for positioning said load device, manually operable control means, a first releasable connection between said motor means and said load device, a second releasable connection between said manual control means and said load device, a member biased to a first position wherein said second connection is completed and drivable by said motor means to a second position wherein said second connection is released, and means for holding said member in said second position and for completing said first connection.

2. Electrical control apparatus, comprising in combination, a load device to be positioned, reversible electrical motor means for positioning said load device, electrical circuit means, means for varying an electrical quantity in said circuit means in accordance with a variable condition indicative of the need for operation of said load device, means responsive to a deviation of said quantity from a predetermined value for controlling said motor means, means driven by said motor means for restoring said electrical quantity to said predetermined value, manually operable control means including a movable element and means positioned by said element for changing the relationship between said variable condition and the position of said load device, a first releasable mechanical connection between said motor means and said load device, said first releasable connection including a first member biased to a first position wherein said connection is released and movable to a second position wherein said connection is completed, a second releasable mechanical connection between said manually operable control means and said load device, a second member biased to a first position wherein said second connection is completed and drivable by said motor means to a second position wherein said second connection is released, electrical means operative when energized to move said first member to said second position and to hold said second member in said second position, first switch means operable to control said circuit means so as to cause operation of said motor means in a direction to drive said second member to said second position, second switch means operable to close an energizing circuit for said electrical means, a single operator for said first and second switch means, means biasing said operator to a first position wherein said first switch means controls said circuit means and said energizing circuit is opened, and means movable with said second member and effective when said second member reaches its second position to move said operator against the action of said biasing means to a second position wherein said first switch means does not control said circuit means and said second switch means closes said energizing circuit.

3. Control apparatus, comprising in combination, a load device to be positioned, motor means for positioning said load device, a gear train between said motor means and said load device including one gear which when held stationary causes the gear to operatively connect said motor means and said load device and when released operatively disconnects said motor means and said load device, releasable holding means for said one gear, manually operable control means, a first lever connected to said manually operable control means for movement therewith, a second lever connected to said load device for movement therewith, said levers having conforming tapered apertures which are aligned when said manually operable control means and said load device are in corresponding positions, an arm, a pin carried by said arm and extending through both of said apertures, said apertures having narrow end portions conforming to said pin, said levers moving as a unit when said pin engages said end portions, so that said load device may then be positioned by said manually operable control means, means biasing said arm to a position wherein said pin passes through the wide portions of said apertures, cam means for moving said arm against the action of said biasing means, spring means for biasing said cam means to a first position wherein said pin engages said end portions, means including said motor means and said one gear for driving said cam means to a second position wherein said pin passes through the wide portions of said apertures, means controlled by said cam means upon movement thereof to said second position for actuating said holding means to hold said one gear, and means effective upon actuation of said holding means to releasably retain said cam means in said second position.

4. Electrical control apparatus, comprising in combination, a load device to be positioned, reversible electrical motor means for positioning said load device, electrical circuit means, means for varying an electrical quantity in said circuit means in accordance with a variable condition indicative of the need for operation of said load device, means responsive to a deviation of said quantity from a predetermined value for controlling said motor means, means driven by said motor means for restoring said electrical quantity to said predetermined value, a releasable mechanical connection between said motor means and said load device, said releasable connection including a first member biased to a first position wherein said connection is released and movable to a second position wherein said connection is completed, a second member biased to a first inactive position and drivable by said motor means to a second active position, electrical means operative when energized to move said first member to said second position and to hold said second member in said second position, first switch means operable to control said circuit means so as to cause operation of said motor means in a direction to drive said second member to said second position, second switch means operable to close an energizing circuit for said electrical means, a single operator for said first and second switch means, means biasing said operator to a first position wherein said first switch means controls said circuit means and said energizing circuit is opened, and means movable with said second member and effective when said second member reaches its second position to move said operator against the action of said biasing means to a second position wherein said first switch means does not control said circuit means and said second switch means closes said energizing circuit.

5. Electrical control apparatus, comprising in combination, a load device to be positioned, reversible electrical motor means for positioning said load device, electrical circuit means, means for varying an electrical quantity in said circuit means in accordance with a variable condition indicative of the need for operation of said load device, means responsive to a deviation of said quantity from a predetermined value for controlling said motor means, a releasable mechanical connection between said motor means and said load device, said releasable connection including a member biased to a first position wherein said connection is released and movable to a second position wherein said connection is completed, means to move said member to said second position, switch means operable to control said circuit means so as to cause operation of said motor means in a predetermined direction, an operator for said switch means, means biasing said operator to a first position wherein said switch means controls said circuit means, means driven by said motor upon movement thereof in said predetermined direction to move said operator against the action of said biasing means to a second position wherein said first switch means does not control said circuit means, and means for retaining said operator in said second position.

6. Control apparatus, comprising in combination, a load device to be positioned, electrical motor means for positioning said load device, means for controlling said motor means, manually operable control means, a first releasable mechanical connection between said motor means and said load device, said first releasable connection including a first member biased to a first position wherein said connection is released and movable to a second position wherein said connection is completed, a second releasable mechanical connection between said manually operable control means and said load device, a second member biased to a first position wherein said second connection is completed and drivable by said motor means to a second position wherein said second connection is released, electrical means operative when energized to move said first member to said second position and to hold said second member in said second position, means including first switch means associated with said motor controlling means and operable from a first position to a second position to cause operation of said motor means in a direction to drive said second member to said second position, second switch means operable to close an energizing circuit for said electrical means, a single operator for said first and second switch means, means biasing said operator to a first position wherein said first switch means is in its second position and said energizing circuit is opened, and means movable with said second member and effective when said second member reaches its second position to move said operator against the action of said biasing means to a second position wherein said first switch means is in its first position and said second switch means closes said energizing circuit.

7. Control apparatus, comprising in combination, a load device to be positioned, electrical motor means for positioning said load device, means for controlling said motor means, manually operable control means, a first releasable mechanical connection between said motor means and said load device, said first releasable connection including a first member biased to a first position wherein said connection is released and movable to a second position wherein said connection is completed, a second releasable mechanical connection between said manually operable control means and said load device, a second member biased to a first position wherein said second connection is completed and drivable by said motor means to a second position wherein said second connection is released, electrical means operative when energized to move said first member to said second position and to hold said second member in said second position, and means responsive to the position of said second member and effective when said second member is in said first position to cause operation of said motor means in a direction to drive said second member to said second position, and effective when said second member is in said second position to cause energization of said electrical means.

8. Control apparatus, comprising in combination, a load device to be positioned, electrical motor means for positioning said load device, means for controlling said motor means, manually operable control means, a first releasable mechanical connection between said motor means and said load device, said first releasable connection including a first member biased to a first position wherein said connection is released and movable to a second position wherein said connection is completed, a second releasable mechanical connection between said manually operable control means and said load device, a second member biased to a first position wherein said second connection is completed and drivable by said motor means to a second position wherein said second connection is released, electrical means operative when energized to move said first member to said second position and to hold said second member in said second position, and switch means operable upon movement of said second member to said second position to close an energizing circuit for said electrical means.

9. Control apparatus, comprising in combination, a load device to be positioned, motor means for positioning said load device, manually operable control means, a first releasable connection between said motor means and said load device, a second releasable connection between said manual control means and said load device, a member biased to a first position wherein said second connection is completed and drivable by said motor means to a second position wherein said second connection is released, and electrical means operative when energized to complete said first connection and to hold said member in said second position.

10. Control apparatus, comprising in combination, a load device to be positioned, motor means for positioning said load device, manually operable control means, a first releasable connection between said motor means and said load device, a second releasable connection between said manual control means and said load device, a member biased to a first position wherein said second connection is completed and drivable by said motor means to a second position wherein said second connection is released, electrical means operative when energized to complete said first connection and to hold said member in said second position, and means for connecting said electrical means and said motor means to the same source of electrical energy.

11. Control apparatus, comprising in combination, a load device to be positioned, motor means for positioning said load device, manually operable control means, a first releasable connection between said motor means and said load device, a second releasable connection between said manual control means and said load device, a member biased to a first position wherein said second connection is completed and drivable by said motor means to a second position wherein said second connection is released, electrical means operative when energized to complete said first connection and to hold said member in said second position, and switch means operative to complete an energizing circuit for said electrical means upon movement of said member to said second position.

12. Control apparatus, comprising in combination, a load device to be positioned, motor means for positioning said load device, a gear train between said motor means and said load device including one gear which when held stationary causes the gear to operatively connect said motor means and said load device and when released operatively disconnects said motor means and said load device, releasable holding means for said one gear, manually operable control means, a releasable mechanical connection between said manually operable control means and said load device, a member biased to a first position wherein said connection is completed and movable to a second position wherein said connection is released, means including said motor means and said one gear for driving said member to said second position, means controlled by said member upon movement thereof to said second position for actuating said holding means to hold said one gear, and means effective upon actuation of said holding means to releasably retain said member in said second position.

13. Control apparatus, comprising in combination, a load device to be positioned, motor means for positioning said load device, a releasable mechanical connection between said motor means and said load device, manually operable control means, a first lever connected to said manually operable control means for movement therewith, a second lever connected to said load device for movement therewith, said levers having conforming tapered apertures which are aligned when said manually operable control means and said load device are in corresponding positions, an arm, a pin carried by said arm and extending through both of said apertures, said apertures having narrow end portions conforming to said pin, said levers moving as a unit when said pin engages said end portions, so that said load device may be positioned by said manually operable control means, means biasing said arm to a position wherein said pin passes through the wide portions of said apertures, cam means for moving said arm against the action of said biasing means, spring means for biasing said cam means to a first position wherein said pin engages said end portions, means including said motor means for driving said cam means to a second position wherein said pin passes through the wide portions of said apertures, means controlled by said cam means upon movement thereof to said second position for completing said releasable connection and for retaining said cam means in said second position.

14. Control apparatus, comprising in combination, a load device to be positioned, motor means for positioning said load device, a releasable mechanical connection between said motor means and said load device, manually operable control means, a first lever connected to said manually operable control means for movement therewith, a second lever connected to said load device for movement therewith, said levers having conforming tapered apertures which are aligned when said manually operable control means and said load device are in corresponding positions, a member extending through both of said apertures, said apertures having narrow end portions conforming to said member, said levers moving as a unit when said member engages said end portions, so that said load device may be positioned by said manually operable control means, means biasing said member to a position wherein it passes through the wide portions of said apertures, cam means for moving said arm against the action of said biasing means, spring means for biasing said cam means to a first position wherein said member engages said end portions, and means including said motor means and said one gear for driving said cam means to a second position wherein said member passes through the wide portions of said apertures, means controlled by said cam means upon movement thereof to said second position to complete said first connection, and to releasably retain said cam means in said second position.

15. Apparatus for controlling the throttle of an internal combustion engine, comprising in combination, motor means for positioning said throttle, manually operable control means, a first releasable connection between said motor means and said throttle, a second releasable connection between said manual control means and said throttle, said second releasable connection including a member biased to a first position wherein said second connection is completed and drivable by said motor means to a second position wherein said second connection is released, and means for holding said member in said second position and for completing said first connection.

16. Electrical apparatus for controlling the pressure of the air supplied to the intake manifold of an internal combustion engine, comprising in combination, a throttle for controlling the flow of air to said intake manifold, reversible electrical motor means for positioning said throttle, electrical circuit means, means for varying an electrical quantity in said circuit means in accordance with the pressure of the air at a point downstream from said throttle, means responsive to a deviation of said quantity from a predetermined value for controlling said motor means, means driven by said motor means for restoring said electrical quantity to said predetermined value, manually operable control means including a movable element and means positioned by said element for changing the relationship between said pressure and the position of said throttle, a first releasable mechanical connection between said motor means and said throttle, a second releasable mechanical connection between said manual control means and said throttle, said second releasable connection including a member biased to a first position wherein said second connection is completed and drivable by said motor means to a second position wherein said second connection is released, and means selectively operable either to hold said member in said second position and to complete said first connection or to release said member for movement to its first position and to release said first connection.

ALBERT E. BAAK.

REFERENCES CITED

The following references are of record in the file of this patent:

UNITED STATES PATENTS

| Number | Name | Date |
| --- | --- | --- |
| 2,083,532 | Kronmiller | June 8, 1937 |

---

Certificate of Correction

Patent No. 2,428,606.

October 7, 1947.

ALBERT E. BAAK

It is hereby certified that errors appear in the printed specification of the above numbered patent requiring correction as follows: Column 8, line 52, claim 3, and column 11, line 68, claim 12, after the word "gear" insert *train*; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*